(12) United States Patent
Wuerstl (10) Patent No.: US 9,056,567 B2
(45) Date of Patent: Jun. 16, 2015

(54) BABY CARRIER IN THE FORM OF A BUCKET SEAT

(75) Inventor: Jan-Stefan Wuerstl, Regnitzlosau (DE)

(73) Assignee: Curt Wuerstl Vermoegensverwaltungs—GmbH & Co. KG, Hof (DE)

( * ) Notice: Subject to any disclaimer, the term of this patent is extended or adjusted under 35 U.S.C. 154(b) by 102 days.

(21) Appl. No.: 13/812,201

(22) PCT Filed: Jul. 25, 2011

(86) PCT No.: PCT/EP2011/062716
§ 371 (c)(1),
(2), (4) Date: Jan. 25, 2013

(87) PCT Pub. No.: WO2012/103964
PCT Pub. Date: Aug. 9, 2012

(65) Prior Publication Data
US 2013/0193723 A1   Aug. 1, 2013

(30) Foreign Application Priority Data

Jan. 31, 2011   (DE) .................... 20 2011 000 229 U (51) Int. Cl.
*B60N 2/28* (2006.01)
*A47D 13/02* (2006.01)
(Continued)

(52) U.S. Cl.
CPC *B60N 2/28* (2013.01); *A47D 13/02* (2013.01); *B60N 2/2845* (2013.01); *B60N 2/2851* (2013.01); *B60N 2/2878* (2013.01);
(Continued)

(58) Field of Classification Search
USPC .......... 297/183, 183.3, 183.4, 256.1, 256.13, 297/467, 473, 481
See application file for complete search history.

(56) References Cited

U.S. PATENT DOCUMENTS

| | | | | |
|---|---|---|---|---|
| 4,274,674 A | * | 6/1981 | Deloustal | 297/256.13 |
| 4,880,277 A | * | 11/1989 | Takahashi et al. | 297/467 |
| 4,998,307 A | * | 3/1991 | Cone | 5/94 |

(Continued)

FOREIGN PATENT DOCUMENTS

| | | |
|---|---|---|
| DE | 42 08 599 | 11/1995 |
| DE | 692 14 778 | 4/1997 |

(Continued)

OTHER PUBLICATIONS

International Search Report of PCT/EP2011/062716, Oct. 25, 2011.
(Continued)

*Primary Examiner* — David R Dunn
*Assistant Examiner* — Timothy J Brindley
(74) *Attorney, Agent, or Firm* — Collard & Roe, P.C.

(57) ABSTRACT

A seat element and a backrest element are integrated in a baby carrier in the form of a bucket seat, such that the angle of inclination can be adjusted. A carrying handle is pivotally and lockably mounted on the lateral walls such that the handle substantially lies on the center of gravity axis of the baby carrier. The outer upper end of the seat element or the backrest element that has an adjustable angle of inclination is mounted on the corresponding end wall in a pivotal manner about a transverse axis. Laterally outward projecting bearing pins of the other inner lower end of the seat element or backrest element are guided in slots of a respective lifting device which is pivotally mounted on the lateral walls, by means of which the pivotally mounted element can be raised from a lowered seating position into a lying position.

15 Claims, 5 Drawing Sheets

(51) Int. Cl.
  *B62B 7/14* (2006.01)
  *B62B 9/10* (2006.01)

(52) U.S. Cl.
  CPC ............... *B62B 7/145* (2013.01); *B62B 9/104* (2013.01); *A47D 13/025* (2013.01)

(56) References Cited

U.S. PATENT DOCUMENTS

| | | | |
|---|---|---|---|
| 5,115,523 A | 5/1992 | Cone | |
| 5,322,343 A * | 6/1994 | Parker et al. | 297/183.3 |
| 5,803,535 A * | 9/1998 | Jane Cabagnero | 297/183.3 |
| 6,126,234 A * | 10/2000 | Cabagnero | 297/256.13 |
| 6,568,755 B1 * | 5/2003 | Groening | 297/256.13 |
| 6,588,849 B2 * | 7/2003 | Glover et al. | 297/467 |
| 7,322,648 B2 * | 1/2008 | Nakagawa et al. | 297/250.1 |
| 7,364,232 B2 * | 4/2008 | Mees van der Bijl et al. | 297/256.1 |
| 7,658,446 B2 * | 2/2010 | Meeker et al. | 297/250.1 |
| 7,934,772 B2 * | 5/2011 | Van der Vegt | 297/256.1 |
| 8,251,446 B1 * | 8/2012 | Guerrido | 297/256.1 |
| 2005/0242642 A1 * | 11/2005 | Kespohl | 297/256.1 |
| 2006/0267388 A1 * | 11/2006 | Bijl et al. | 297/256.1 |
| 2008/0231098 A1 * | 9/2008 | Van der Vegt | 297/250.1 |
| 2009/0167065 A1 * | 7/2009 | Kespohl | 297/183.4 |
| 2009/0184549 A1 * | 7/2009 | Kassai et al. | 297/256.1 |

FOREIGN PATENT DOCUMENTS

| | | |
|---|---|---|
| DE | 103 36 167 | 2/2005 |
| DE | 20 2006 014 144 | 1/2007 |
| EP | 0 218 444 | 4/1987 |
| EP | 0 371 524 | 6/1990 |
| EP | 0 545 185 | 10/1996 |
| EP | 1 481 616 | 12/2004 |

OTHER PUBLICATIONS

English Translation of Chinese Office Action dated Nov. 4, 2014 in Chinese Application No. 201180035053.1.

* cited by examiner

BABY CARRIER IN THE FORM OF A BUCKET SEAT

CROSS REFERENCE TO RELATED APPLICATIONS

This application is the National Stage of PCT/EP2011/062716 filed on Jul. 25, 2011, which claims priority under 35 U.S.C. §119 of German Application No. 20 2011 000 229.2 filed on Jan. 31, 2011, the disclosures of which are incorporated by reference. The international application under PCT article 21(2) was not published in English.

The invention relates a baby carrier in the form of a bucket seat with the features indicated in the preamble of claim 1.

A baby carrier in the form of a bucket seat is known from DE 20 2006 014 114 U1, which forms an inner region with a seating surface for holding a baby and has side walls, a carrying yoke, which is fastened to the outer side of a side wall at least by means of a retaining pivot joint, and an underside with a pair of integrated skids, which are from the side wall, with floor contact surfaces. In addition the baby carrier has a crossbar, which connects the side walls in the backrest region, or a connecting wall and an inserted backrest, which is arranged to be adjustable in angle of inclination relative to the seating surface about a lower pivot axis. At least one centrally protruding support wall is provided at the backrest at the rear side, or side walls—which protrude at the sides—with a raster of apertures or notches in the pivot radius region of the backrest are provided on both sides. The aperture or notch raster co-operates with disengageable detent means fixed in the bucket seat. Alternatively, a yoke or support settable in detent recesses at the connecting wall can be provided at the rear side. In a further alternative provision is made for the backrest to be able to be drawn forward downwardly through a predetermined amount in longitudinal direction together with the pivot axle or relative thereto and detented by lateral detent protrusions in a row of detent recesses at the inner sides of the side walls, whereby an adjustment of angle of inclination in steps is guaranteed.

A baby carrier in the form of a bucket seat arranged in a specific holder is additionally known from EP 0 371 524 A1. Moreover, a bucket seat as a baby carrier according to the categorising construction is known from EP 0 218 444 B1 and DE 42 08 599 C2.

A child seat of a special kind, which can also be used a baby carrier and is composed of three parts, is known from DE 103 36 167 B3 and EP 1 481 616 B1. This seat is distinguished by a U-shaped carrier to which pivot joints of a carrying yoke are fastened. Not only a seat part, but also a backrest part are arranged between the side walls of the U-shaped carrier to be pivotable relative to one another and relative to the U-shaped carrier. Conversion to a variant of use as a baby bed is thereby possible. The underside of the U-shaped carrier is similarly formed to be curved, whereby a tipping function can be realised.

A baby carrier consisting of two pivotably interconnected parts, namely a seat part and a backrest part with side arms is known from DE 692 14 778 T2 (EP 0 545 185 B1). Different inclined settings of the backrest relative to the seat part can in that case be realised by the settable pivot joint. The pivot joint at the same time serves as a rotary joint for the carrying yoke. All the loads exerted by the sitting baby on the baby carrier are in that case accepted by the joint.

In the case of baby carriers of the categorising kind, which can also be used as doll carriers or designed as such in reduced form, the backrest can indeed be adjusted in angle of inclination within certain ranges, coupled with a displacing movement; equally in the case of child seats having divided forms the backrests can be adjusted in angle of inclination relative to the seat part. However, manipulation is relatively complicated and, if a small child is sitting in the baby carrier, virtually impossible, since the elements and detent means to be moved are not accessible.

Proceeding from the prior art the invention has the object of improving a baby carrier with an adjustable seat element and/or backrest element in such a manner that a simple and rapidly performable adjustment of angle of inclination of at least one of the parts is made possible and in combination both parts are adjustable in desired manner in angle of inclination in order to achieve greater lying and sitting comfort. The adjustment of angle of inclination is to be possible even when a small child or a doll is seated in the baby carrier.

The invention fulfils the object by design of the baby carrier in accordance with the technical teaching indicated in claim 1, according to which the seat element or backrest element adjustable in angle of inclination is mounted by the outer, upper end thereof at the associated end wall to be pivotably movable about an axis extending transversely to the longitudinal axis of the baby carrier and the other, inner, lower end of the seat element or backrest element is operatively connected with laterally outwardly protruding bearing pins in gate guides of a manually actuable lifting device pivotably mounted at the side walls, by means of which the pivotably mounted element is adjustable in height from a lowered seating position into a lying position.

The gate guide or guide cam, which is provided in or at the lifting device, produces—on pivotation of the lifting device—displacement of the pivot axle, which is defined by the bearing pins, in order to compensate for the different positions, which are given by the different pivot radii of the seat element or backrest element on the one hand and the lifting device on the other hand, between pivot axle and bearing pins in the case of simultaneous adjustment and height. The gate guide is in addition so constructed that in desired manner a raising of the seat element or backrest element, according to which is coupled therewith, from a lower seating position to a raised lying position takes place automatically on pivotation of the lift device. Through the pivotably movable mounting of the respective element at the associated end surface it is apparent that a stationary pivot axis is provided here. The element is pivoted upwardly or lowered downwardly about this pivot axis by the lifting device, in which case the bearing pins are displaced in the gate guide. For this purpose, the rotary bearings, which are provided at the end walls, of the lateral lifting devices are arranged above the highest position setting of the element coupled therewith.

The lifting device can itself consist of approximately triangular segment discs, which are mounted on both sides at the inner sides of the side walls of the bucket seat and which are either coupled in terms of movement, for example by way of a transversely extending lower rod, or actuable individually and can also have grips to enable pivotation in the desired manner. The gate guide is formed in this segment disc in correspondence with the desired movement sequence so that when pivotation takes place the respective bearing pin can slide along in the gate guide. Through formation of latches or depressions in the lower slide pin of the gate guide several intermediate settings can be adopted in the adjustment of angle of inclination. The end setting should be defined by the end of the gate guide or the gate guide path can be so designed or the pivot angle of the lifting device so limited that further raising is not possible when the highest position is reached. The gate guide extends between the lateral ends of the short, upper limb of the segment disc and the end of the long, second limb, which is arranged approximately at a 90° angle. The lifting device can obviously also consist of a plastics-material moulded part which does not have surfaces, but only of frame-shaped or L-shaped construction. The bearing spigot or a bearing bush, which can be inserted into a bearing in the side wall or which can be drawn onto a bearing pin, can be integrally formed at this plastics-material moulded part. A different fastening, for example by means of screw or rivet or by means of a plastics-material bearing, is also possible.

However, the invention is also usable when both elements, namely the seat element and the backrest element, are adjustable simultaneously in angle of inclination relative to one another and relative to the bucket seat end walls. For this purpose, provision is made for that element, which is not mounted by the outer end thereof at the associated end wall about the horizontal pivot axis, to displaceably bear by the outer end against the inner side of the associated end wall and/or by lateral strips and/or by lateral strips in X-shaped guides against the inner sides of the side walls, whilst the other, inner end is connected with the inner end of the other element to be pivotably movable. Through the pivotably movable coupling of the two elements in the region of the two lateral bearing pins at the one element, a direct movement transformation between the elements takes place through the coupling together. The second element, for example the backrest element, in that case has to be able to follow the actual length of the two elements in extended and bent state and accordingly slidably bears against the associated end wall or can move in the X-shaped lateral guide by an engaging strip-shaped guide part, wherein the X-shape is required in order to be able to compensate for the simultaneous pivoting and sliding movement. The backrest can obviously also have side protective parts for the head of the small child.

In principle, the lifting device can be arranged to be visible. It can, however, also be concealed behind a cushion which is in any case inserted into a baby carrier. Pivotation of the lifting device is always possible, for which purpose the segment disc, the segment frame or L-support protrudes at the inner side from the plane of the side wall and can always be gripped by a hand.

The pivotably movable connection between the backrest element and the seat element can, for example, be produced by check hinge sections at the elements, which are connected together by pins. In a simplest construction the seat element can also have, at the lower end, lateral web-shaped prolongations at which the outwardly protruding bearing pins are provided, which are connected together by way of a round axle or have inwardly protruding bearing pins onto which the backrest element can be pressed by a section, which is matched in width, with a detent groove or grooves. The two parts are thereby equally connected together to be pivotably movable. However, a simple mounting of the backrest element on these protruding pin parts or a continuous round rod is additionally also possible. Any other hinge-like connection is, however, also usable here.

If the pivot axis of the lifting device is congruent with the pivot axis of the carrying yoke, it is possible in simple manner to connect the lifting device with the rotationally movable bearing of the carrying yoke by way of a fixed or detachable coupling, so that when the carrying yoke is pivoted the lifting device is automatically actuated therewith. This has the advantage that manual actuation within the seat no longer has to be undertaken, but by folding over the carrying yoke through a defined angle the lifting device is automatically actuated therewith. If this is not desired, thus if the two elements are to remain in the inclined seating position, which is required, for example, in the case of use of the baby carrier in a motor vehicle during travel, it is possible through actuation of the coupling to release the connection between the rotationally movable bearing parts so that the carrying yoke is independently operable.

A detachable coupling can, for example, be realised in that a button protrudes at the pivot joint of the carrying yoke, by way of which button a coupling pin or coupling slide is displaceable, which is engageable through a bore in a rotary bush in a bore in the rotary pin of the lifting device and in the case of opposite or repeated actuation, for example with use of a detent mechanism with tongue and heart cam, is disengageable again. Equally, however, a toggle-joint detenting means or a simple slide can be provided. It is thereby possible to pivot the carrying yoke from the carrying position rearwardly over the backrest and let it end in the rearward region of the bucket seat without the lifting device being actuated. If the seat is mounted on a vehicle seat then, for example, for avoidance of injuries the carrying yoke should not protrude upwardly. Similarly, the baby carrier must then be located in the seating position. The seat then also remains in one position. If, thereagainst, the baby carrier is taken out of the mount of the vehicle and used as a lying-down seat, for example in a domestic situation, then through detenting the coupling the effect can be achieved that on folding over the carrying yoke rearwardly the bearing pins are at the same time raised by way of the lifting device and the two elements can thereby be brought relative to one another into a lying position. If, however, the child is to be carried again, then it is necessary to pivot up the carrying yoke, whereby the connecting axle is automatically lowered downwardly. The coupling can, however, also in that case be switched to be ineffective so that the small child can also be carried lying down. Through catch recesses in the gate guide different positions can also be set by inclined settings of the elements, in which case through exertion of a defined excess lifting force the bearing pins are automatically forced out of the latches of the gate guide and the movement of the adjustment axis of the two parts into the respective end selling is possible.

In principle, the carrying yoke, as is usually the case, can be pivotably connected on the outer side with the side walls by way of pivot joints. It can, however, also be pivotably connected at the inner side and have a respective lifting device in prolongation of each of the joints. The carrying yoke, which usually consists of plastics material, can thus also have lifting devices formed laterally at the joints. Equally, the other detent means of known kind can be provided at the pivot joints of the carrying yoke in order to keep these secured in the respective settings, for example in the forwardly folded, rearwardly folded or erected position. The known detent means can in that case act on the lifting device if, for example, in the erected position the carrying yoke is detested by way of that, in which case the lowered position of the elements is similarly secured. A detenting, which fixes the lying position, can also be provided when the carrying yoke is folded over, for example after being brought rearwardly beyond the head end of the backrest element.

A baby carrier according to the invention can also comprise a bucket seat which at the lower side is formed at the side walls, for example, to be skid-shaped and has fastening devices for fixing the baby carrier at fixing points of a child carriage or an ISOFIX base carrier at a vehicle seat of a motor vehicle.

A baby carrier of the described kind can in principle also be equipped with known belt systems in order to be able to securely hold a small child in the baby carrier. For this purpose, for example, a step belt can protrude at the seat element axially centrally from the plane at a specific spacing from the lower end of the seat element and has, for example, a lock casing for receiving lock tongues at harness belts, which are adjustable in length at the back rest, preferably guided through the rearward end wall. Such arrangements are usual in the case of known baby carriers which cannot be adjusted in angular inclination in correspondence with the subject of the invention. It will be evident that when the seat element and backrest element are brought out of a seating position into a lying position through the indicated height adjustment device, namely an eccentric guide, there is change in the effective length of lying against the body. The effective belt length between step belt and end of the shoulder belt is in effect shortened relative to the extended body. Compensation for this can obviously be made by readjusting the lengths of the shoulder belts.

In a form of embodiment according to the invention it is provided that the step belt, which protrudes axially centrally from the plane of the seat element and to which a harness belt system fixed to the backrest element is fastenable, is adjustable in the protruding length.

This can take place, for example, through a reeling-up device, which is manually operable, when the belt is guided through a gap through the seat element and the reeling-up device is located to be accessible at the front side of the front end wall. This reeling-up device can, for example, be operatively connected with a detent locking mechanism in order to be able to lock the belt in the different withdrawn lengths.

The step belt can, however, also be directly settable in dependence on the seating position and lying position of the seat element, for which purpose it is fixed by its lower end to the end wall below, in front of or behind the pivot axis of the seat element and is placed around a guide element or guided through a slot-shaped guide element, which is displaceably mounted in a guide recess in the seat element. The guide recess can be a U-shaped recess which is formed at the end side and the depth of which substantially determines the displacement travel of the guide element and thus also the additional active length, which becomes free, of the belt system. This guide element can be brought at least into the two end positions within the guide recess. In the seating position it should be displaced furthest relative to the pivot axis, whereagainst in the lying position it should lie near the pivot axis of the seat element. It will be evident that the protruding length can thereby be increased so that supplemented by the harness belts the system basically enables slipping forward of the child into the lying-down position, but still offers secure retention.

The length compensation can take place automatically, for which purpose, for example, a guide element is fastened at the front side to the belt, which is deflected at the front side in or at the end wall and led through a guide passage into the interior space of the bucket seat and after deflection in the region below the end of the seat element fastened at the top to the seat element or the back element. A stitched eyelet, through which a pin of the hinge between seat element and backrest element can be inserted, is, for example, suitable for the fastening. It will be apparent that when the belt is installed in this manner, the guide element in the seating position of the seat element lies in the setting furthest from the pivot axis of the seat element and on pivotation up of the seat element, during bringing into the lying position, is drawn forwardly until it passes into the end position. The step belt itself always has the same length, so that the active length protruding from the plane of the seat element automatically increases and thus readjustment of the length of the harness belt is avoided. Instead of the indicated adjustment possibilities by means of a belt, the adjustment can obviously also be managed by way of a rod transmission or a manually performable adjustment via lateral detent rows at the guide recesses, in which laterally protruding pins at the guide element engage and are adjustable in steps.

The invention is additionally explained in the following by way of the embodiments illustrated in the drawings, in which.

A bucket seat 1 of a baby carrier is illustrated in the figures, which comprises a base part 2, side walls 3a and 3b and end walls 4a and 4b. Such a bucket seat 1 produced from plastics material in a foam injection-moulding process or in a blow-moulding process from plastics material film is known as such. A respective pivot bearing 20 of a carrying yoke 17, which can be brought into different pivot settings, is located on the outside at each of the side walls 3a, 3b at this bucket seat 1.

Figure 1:
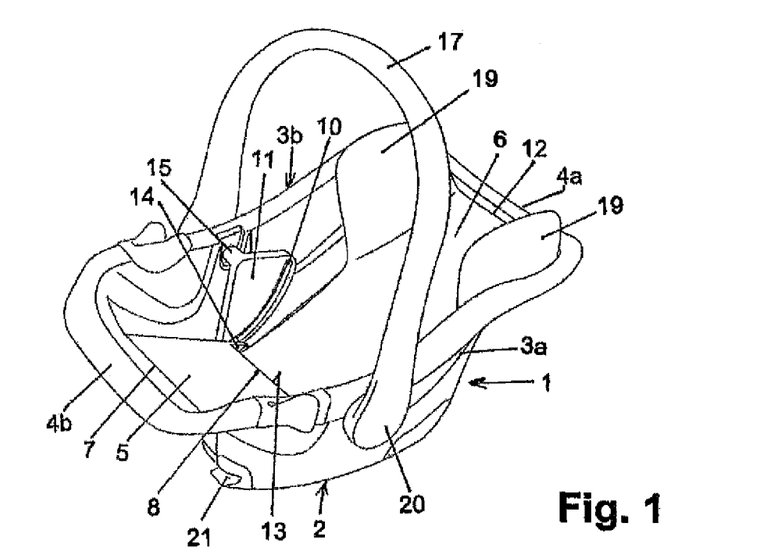
FIG. 1 shows, in a perspective plan view, a baby carrier with the lifting device provided in accordance with the invention.
Figure 2:
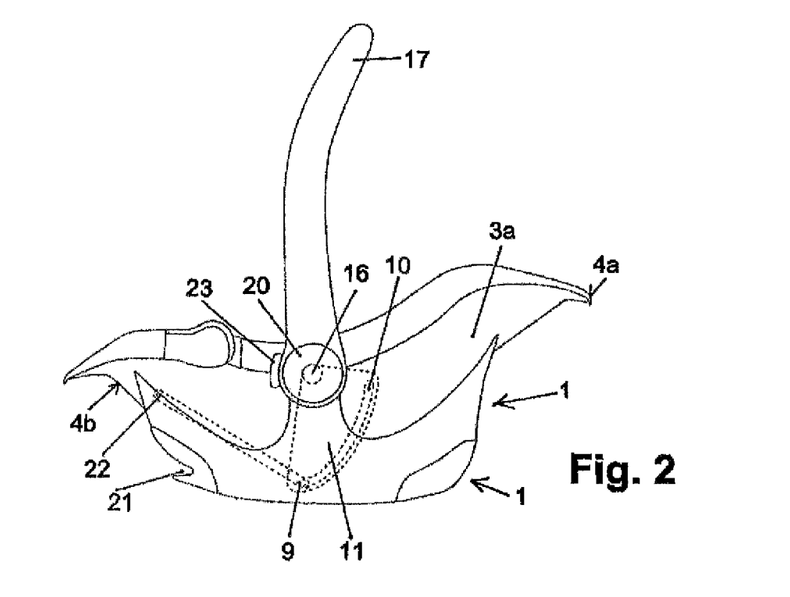
FIG. 2 shows a side view of the baby carrier illustrated in FIG. 1, with lifting device depicted in dotted lines.
Figure 3:
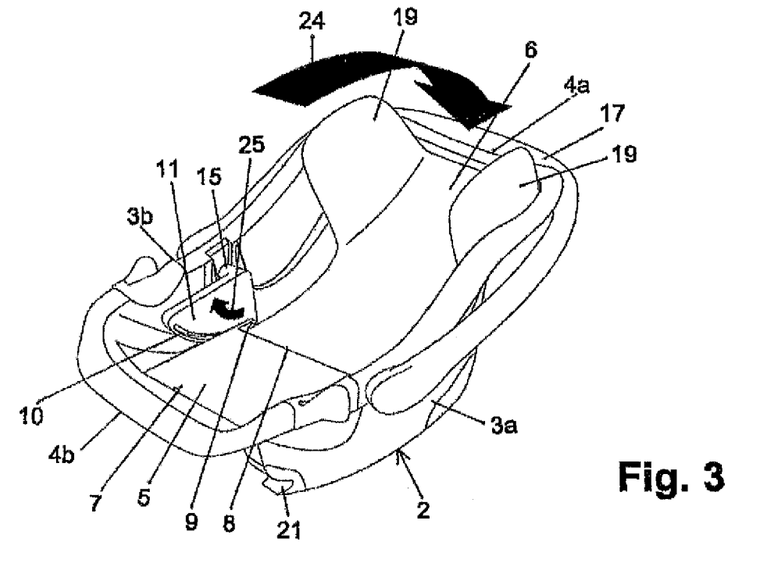
FIG. 3 shows the baby carrier, which is illustrated in FIGS. 1 and 2, with folded-over carrying yoke and pivoted-forward lifting device in a further perspective plan view.
Figure 4:
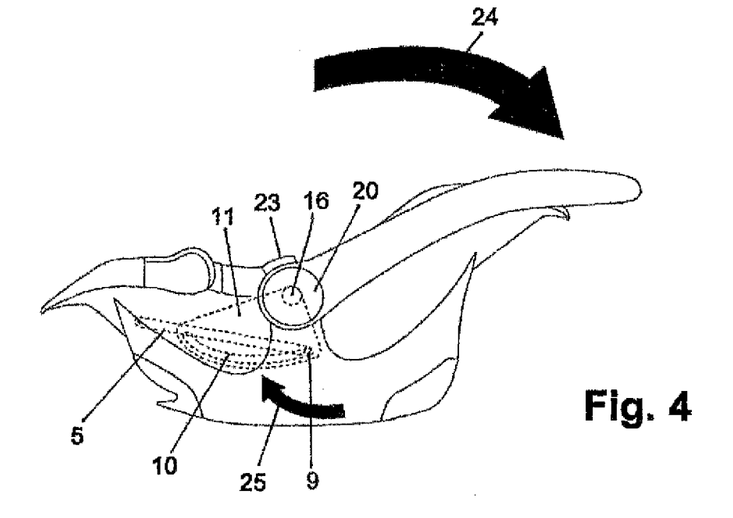
FIG. 4 shows the baby carrier according to FIG. 3 in side view with lifting device depicted in dotted lines.
Figure 5:
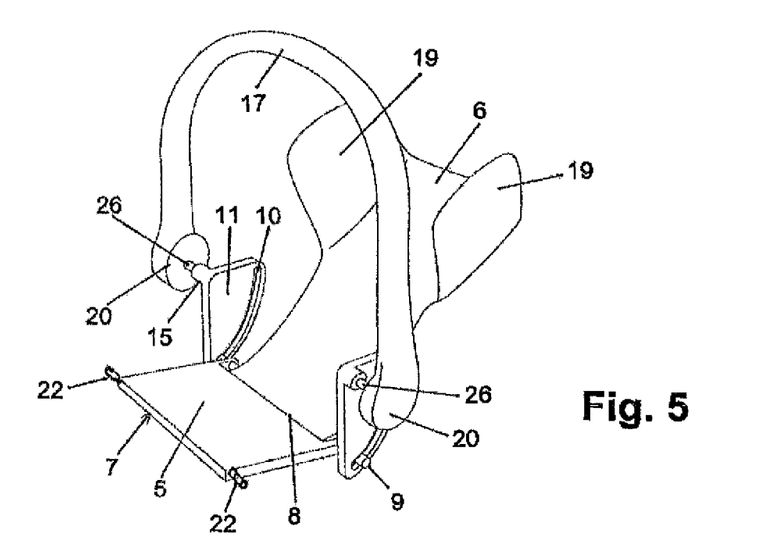
FIG. 5 shows, in isolation, the lifting device together with a seat element and a backrest element, in simplified illustration in seating position.
Figure 6:
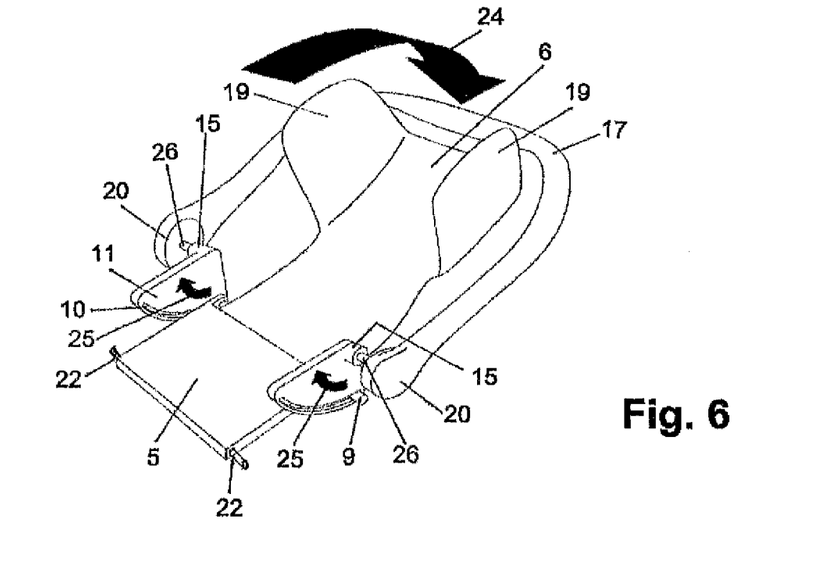
FIG. 6 shows, in perspective illustration, the elements, which are illustrated in isolation, in the lying position.
Figure 7:
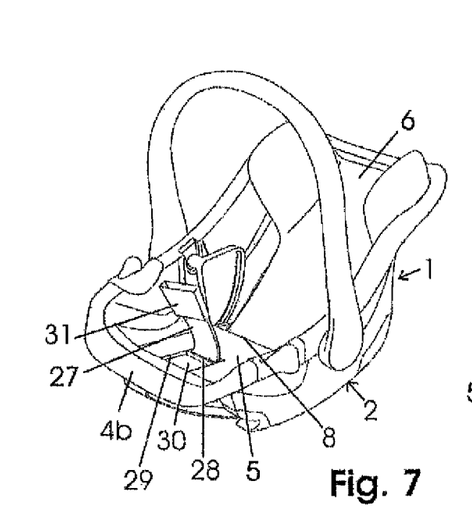
FIG. 7 shows a baby carrier according to FIG. 1, but equipped with a step belt for a belt system (not illustrated) in the baby carrier.
Figure 8:
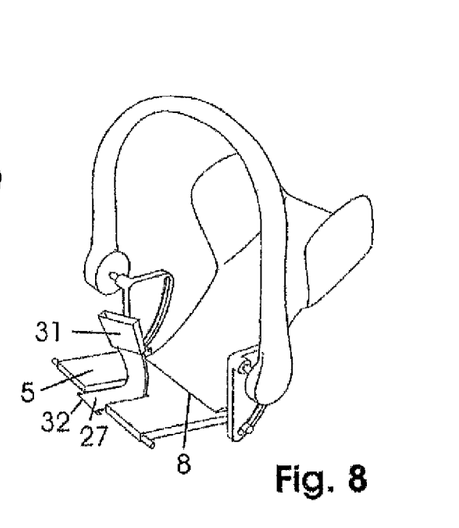
FIG. 8 shows the positioning of the step belt within a guide recess in the seat element in the seating position.

The carrying yoke 17 is illustrated in FIGS. 1, 2 and 5 extending perpendicularly in the carrying position, and in FIGS. 3, 4 and 6 in a tipped position in which the carrying yoke 17 is disposed behind the backrest element 6 and thus frees a view of the entire baby carrier. The pivot bearing 20 of the carrying yoke 17 is not illustrated in detail. However, it has inwardly disposed elements in order to detent in the respective positions. The respective detesting is releasable again by way of a detent button 23 in order to be able to bring the carrying yoke 17 into different detent settings. This is known.

A seat element 5 and a backrest element 6 are inserted into the bucket seat 1. The seat element 5 is arranged by the front upper end to be pivotable about a pivot axis 22 and virtually adjoins the end wall 4b. In a simplest embodiment lateral pins can be provided which detent in bearing recesses in the side walls 3a and 3b. The seat element 5 is pivotable upwardly and downwardly about this front pivot axis 22. The rear, lower end 8 or the end 8, which reaches up to the base part, of the seat element 5 has at the bottom a transversely extending cut-out 14 so that two limbs are provided, which protrude laterally and to which bearing pins 9 projecting outwardly are fastened. Moreover, these bearing pins 9 are respectively prolonged on the inner side of the limbs and form a pivot bearing for a plugged-on or detented-on lower end 13 of a backrest element 6.

The backrest element 6 is constructed to be significantly longer than the seat element 5 and bears by the upper end 12 against a slide surface of the end wall 4a, so that it is displaceable in height relative thereto in the case of simultaneous adjustment of angle of inclination. The outwardly protruding bearing pins 9 each engage in a respective gate guide 10 of a lifting device 11. The gate guide 10 forms a guide cam and is constructed to be curved. The lifting device 11 itself is in this embodiment constructed as a flat element, namely as a segment disc, but can also be constructed to be frame-shaped. It forms a triangle, so that the gate guide 10 extends in a curve between the end at the lower, long limb and the end of the upper, shorter limb. The length of the gate guide is determined substantially by the pivot angle of the carrying yoke 17, which is fixedly connected with the pivot axle 15 via the protruding pins 26, as well as by the desired amount of lowering. The pin 26 engages through the side wall 3a, 3b and extends in the respective pivot bearing 20 of the carrying yoke 17. It is also possible through a coupling (not illustrated) to uncouple the pin 26 from the pivot joint 20 so that the carrying yoke 17 can thereby be pivoted independently of the lifting device 11 and when the coupling is detented.

With assumption of a fixed coupling, the lifting device 11 adopts the position, which is illustrated in FIGS. 1, 2 and 5, during carrying of the baby carrier, so that the seat element 5 ends, extending at an inclination, directly above the base part 2. At the same time, however, the backrest element 6 is also drawn into such a maximum inclined position that a strongly angled seat arrangement between the two elements 5 and 6 is provided. On pivotation of the carrying yoke 17 to the right or rearwardly, as indicated by way of the arrow 24, the lifting device 11 is automatically pivoted therewith and, in particular, forwardly and raised and in that case guides the bearing pins 9 along the gate guide 10. This gate guide 10 is designed so that by virtue of the pivot radius the seat element 5 is automatically pivoted upwardly about the pivot axis 22, which is apparent from FIGS. 3, 4 and 6. In the end setting, in which the bearing pins pass into the rearward region of the gate guide 10, the seat element 5 and the backrest element 6 complement one another to form a slightly inclined lying-down surface, which can also be formed to be relatively flat; this is evident from FIG. 6. For this purpose, the carrying yoke 16 is thus pivoted rearwardly behind the lateral protective walls 19, which are provided for protection of the head of the small child, of the backrest element 6. If the carrying yoke 10 is re-erected from the inclined setting, thus brought into the perpendicular carrying position, then the bearing pins 19 are automatically guided downwardly in the gate guide 10, which is apparent from FIGS. 1 and 2 as well as FIG. 5.

The pivot axis 16 is disposed above the centre of gravity of the baby carrier, so that a balanced carrying of the baby carrier is possible. Mounts 21 are additionally provided in the side walls 3a, 3b, particularly at attached skid-shaped parts, so that the seat can, for example, be coupled to an ISOFIX system at a motor vehicle.

The invention is not restricted to the illustrated embodiment. The pivotable lifting device can also have other forms, as far as toggle joints with inserted gate guide 10. For example, a retaining web can be provided at the top and a downwardly extending web, in which a gate guide 10 is formed, provided thereat. In addition, a mechanical coupling between the carrying yoke 17 and the lifting device 11 does not need to be provided; the axes can, for example, also lie one below the other or adjacent to one another if the lifting device 11 is constructed to be manually actuable. Equally, the carrying yoke 17 can also be pivotably connected at the inner side with the side walls 3a, 3b; in this case, the lifting device 11 can be an integrally formed lifting device if the carrying yoke 17 consists of plastics material. instead of a gate guide 10, a limb engaging under the pin 10 and formed to be curved can also be provided, along which the respective pin 9 slides when the engagement under takes place.

In order to completely protect the child and render the lifting device invisible, lateral inner cushions can completely cover the lifting device 11. Similarly, it is possible to provide the gate guide 10 with latches in which the bearing pins 9 can detent in order to be able to fix the elements in different inclined settings.

A variant of embodiment of the baby carrier illustrated in FIGS. 1 to 6 is depicted in FIGS. 7 to 12 and the additional components thereof illustrated, which comprise a step belt 27 which is guided in a guide element 28 mounted in a guide recess 29 to be displaceable on the centre axis of the seat element. This step belt 27 has at its upper end a lock casing 31 of known kind in which the lock tongues of a harness belt system (not illustrated) at the backrest element 6 are fastenable. The step belt 27 is, as apparent from FIG. 8, fastened at the front side to the side wall 4b by means of fixing 32 and guided from below upwardly through the displaceable guide element 28. In the seating position of the seat element 5, in which the lower end 8 comes closest to the base part 2 of the bucket seat 1, the guide element 28 is disposed in the lower position in the guide recess 29, thus furthest from the pivot axis 22 of the seat element 5.

Figure 9:
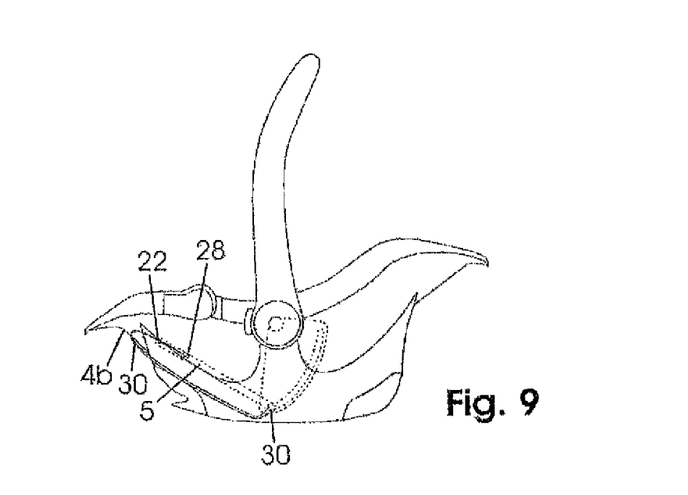
FIG. 9 shows a side view, in which the guide element for the step belt is set in the position furthest from the pivot axis of the seat element.
Figure 10:
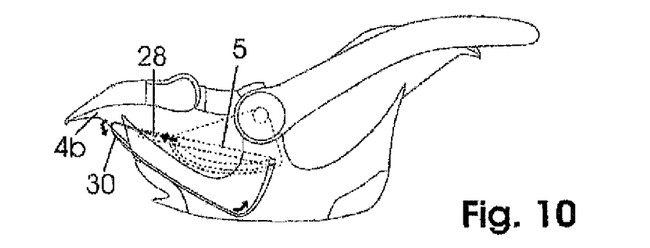
FIG. 10 shows a side view of the baby carrier illustrated in FIGS. 7 to 9, in which the guide element for the step belt is drawn forwardly by way of a belt when the seat element is pivoted up.
Figure 11:
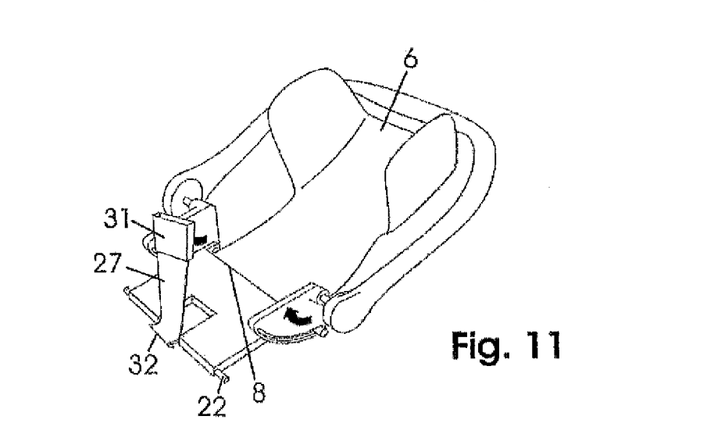
FIG. 11 shows the position of the step belt assumed in the case of adjustment of the seat element and the backrest element into the lying position and FIG. 12 shows a perspective illustration of the baby carrier in the lying position with a step belt.
Figure 12:
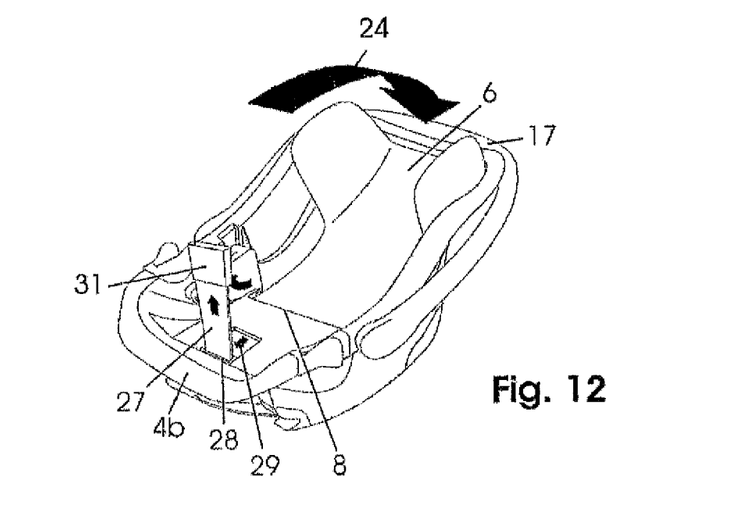

It is apparent in the embodiment in FIG. 9 that a belt 30 is connected with the guide element 28 with the slot for receiving the step belt 27, which belt 30 is guided within a passage in the end wall 4b initially outwardly and then is deflected inwardly through the wall itself in the lower region back into the bucket seat 1. The lower protruding end is fastened to the seat element 5, as evident from FIG. 9. If through the eccentric guide of the lifting device the seat element 5 is now brought from the seating position in FIG. 9 into the lying position according to FIGS. 10, 11 and 12, then it is apparent that a tension force is exerted on the belt 30 which automatically draws the guide element 28 forward and thus brings the step belt 27 into the position illustrated in FIG. 11, namely forwardly into the region of the pivot axis 32. It is apparent from FIG. 12 that this is managed by folding over the carrying yoke 17 in correspondence with the arrow 24. The step belt 27 can then be drawn upwardly through the guide element 28 by the dimension of the depth of the guide recess and thus the available actual length can be increased, which is necessary so that the small child is securely held in the lying-down position, but is not clamped in place.

REFERENCE NUMERAL LIST 1 bucket seat
2 base part
3a side wall
3b side wall
4a end wall
4b end wall
5 seat element
6 backrest element
7 end (seat element, top)
8 end (seat element, bottom)

9 bearing pin
10 gate guide
11 lifting device
12 end (backrest, top)
13 end (backrest, bottom)
14 cut-out
15 pivot axis
16 pivot axis
17 carrying yoke
19 side insert
20 pivot bearing
21 mount
22 pivot axis
23 detent button
24 arrow
25 arrow
26 pin
27 step belt
27 guide element
29 guide recess
30 belt
31 lock casing
32 fixing

The invention claimed is:

1. A baby carrier comprising:
a bucket seat, comprising:
 (a) a base part,
 (b) side walls connected to the base part, and
 (c) first and second end walls connected to the base part,
a seat element disposed in the bucket seat,
a backrest element disposed in the bucket seat, wherein at least one of the seat element and backrest element is mounted to be adjustable in angle of inclination,
a carrying yoke pivotably mounted at the side walls substantially on a centre-of-gravity axis of the baby carrier and lockable at least in a perpendicular carrying setting,
wherein the seat element or backrest element that is adjustable in angle of inclination is mounted by an outer upper end thereof at one of the end walls to be pivotably movable about an axis extending transversely to a longitudinal axis of the baby carrier, and
wherein an inner, lower end of the seat element or backrest element that is adjustable in angle of inclination is operatively connected with laterally outwardly protruding bearing pins in gate guides of respectively manually actuable lifting devices pivotably mounted at the side walls, by means of which the respective seat element or backrest element is adjustable in height from a lowered seating position into a lying position.

2. The baby carrier according to claim 1, wherein the seat element is mounted by the upper end thereof at the first end wall about a horizontal pivot axis and wherein the backrest element has one end that bears against the second end wall and is mounted by another end at the seat element so as to be pivotably movable.

3. The baby carrier according to claim 2, further comprising a slide surface or a bead-shaped slide element extending transversely at the second end wall.

4. The baby carrier according to claim 2, wherein an axis of rotation of the seat and backrest elements is provided on an inner pivot axis of the seat element, said axis of rotation being formed by two protruding lateral pins.

5. The baby carrier according to claim 2, wherein the seat element has at least one cut-out in a region of an axis of rotation, in which cut-out an end of a lower section of the backrest engages in hinge-like manner and is connected by connecting pins.

6. The baby carrier according to claim 1, wherein a pivot axle of each lifting device lies congruently with a respective pivot axle of the carrying yoke and wherein each pivot axle of the lifting device is connected with the respective pivot axle of the carrying yoke by way of a fixed or releasable coupling.

7. The baby carrier according to claim 6, wherein in the carrying setting of the carrying yoke, the seat element and backrest elements adopt a seat setting, and on rearward pivoting of the carrying yoke in a direction of a rearward end surface by way of the gate guides, both the seat element and backrest element can be raised up into a lying position.

8. The baby carrier according to claim 1, wherein the carrying yoke is pivotably mounted at an inner side or outer side of the side walls.

9. The baby carrier according to claim 6, wherein a coupling element is provided between a pin or a bush of the pivot bearing of the lifting device and a movable bearing part of the carrying yoke and is manually operable, so that in an engaged state the coupling element connects together the pin or bush and the movable bearing, and in another setting uncouples the pin or bush from the movable bearing, so that the carrying yoke is pivotable independently of adjustment of the lifting device.

10. The baby carrier according to claim 1, wherein the lifting device consists of two laterally arranged disc segments, each disc segment having a longer limb and a shorter limb, wherein the pivot axle is provided at a corner of the disc segment, and wherein the gate guide is formed in the disc segment or mounted thereon and runs in a curve between outer ends of the limbs.

11. The baby carrier according to claim 10, wherein detent depressions enabling intermediate settings between a seating position and lying position are formed in the gate guides.

12. The baby carrier according to claim 1, wherein fastening devices for fixing the baby carrier to fixing points of a child carriage or an ISOFIX base support at a vehicle seat in a motor vehicle are provided at a lower region of the bucket seat at the side walls or the base part.

13. The baby carrier according to claim 1, further comprising a step belt for a harness belt system at the backrest element, said step belt protruding axially centrally from a plane of the seat element, wherein the step belt has a protruding length that is settable in dependence on a seating position and lying position of the seat element.

14. The baby carrier according to claim 13, wherein the step belt is fastened by its lower end to the first end wall below, in front of or behind a pivot axis of the seat element and is placed around or guided through a guide element, and wherein the guide element is displaceably mounted in a guide recess in the seat element and can be brought into at least two spaced-apart end positions within the guide recess.

15. The baby carrier according to claim 13, wherein a belt is fastened to the guide element at a front side and deflected in or at the first end wall and is guided through a guide passage into an interior space of the bucket seat, and after deflection in a region below the end of the seat element is fastened at a top to the seat element or to the backrest element.

* * * * *